United States Patent [19]

Buquet et al.

[11] Patent Number: 5,662,272

[45] Date of Patent: Sep. 2, 1997

[54] POWDER COATING PRODUCT SPRAYER DEVICE

[75] Inventors: Thierry Buquet, Saint Pierre d'Allevard; Paul Santarelli, Lyons; Eric Ghio, Grenoble, all of France

[73] Assignee: Sames S.A., Meylan, France

[21] Appl. No.: 455,291

[22] Filed: May 31, 1995

[30] Foreign Application Priority Data

Jun. 1, 1994 [FR] France ................... 94 06679

[51] Int. Cl.$^6$ .................................................. B05B 5/00
[52] U.S. Cl. .................. 239/325; 222/412; 222/63; 198/675; 198/676; 239/704; 239/654; 239/132.1
[58] Field of Search .............................. 222/63, 412, 413, 222/333; 239/132.1, 654, 690, 704, 325; 198/675, 676; 73/862.38

[56] References Cited

U.S. PATENT DOCUMENTS

| | | | |
|---|---|---|---|
| 3,564,651 | 2/1971 | Covington, Jr. et al. | 198/676 X |
| 3,604,599 | 9/1971 | Richmond | 222/413 X |
| 4,600,150 | 7/1986 | Zelasko | 198/675 X |
| 4,667,852 | 5/1987 | Siemann | 222/63 X |
| 5,240,185 | 8/1993 | Kaiju et al. | |
| 5,261,743 | 11/1993 | Moller | 222/63 X |
| 5,323,547 | 6/1994 | Kaiju et al. | |
| 5,335,828 | 8/1994 | Kaiju et al. | |

FOREIGN PATENT DOCUMENTS

| | | |
|---|---|---|
| 0496165 | 7/1992 | European Pat. Off. . |
| 8705539 | 7/1987 | Germany . |
| 2189326 | 10/1987 | United Kingdom . |
| PCT/FR94/00592 | 5/1994 | WIPO . |

OTHER PUBLICATIONS

Patent Abstracts of Japan vol. 5 n° 127 (M–083) Aug. 1981 JP–A–56 065 708.
Patent Abstracts of Japan vol. 5 n° 127 (M–083) Aug. 1981 JP–A– 56 065 709.
Patent Abstracts of Japan vol. 10 n° 128 (M–475) May 1986 JP–A–60 248 510.

*Primary Examiner*—Kevin P. Shaver
*Attorney, Agent, or Firm*—Loeb & Loeb LLP

[57] ABSTRACT

A device for delivering a finely divided coating product to a sprayer. The device includes a conveyer composed of a tube and a worm screw mounted in the tube for transporting the coating product, and a motor coupled to the worm screw for rotating the worm screw. The device is constructed for limiting the torque which must be transferred from the motor to the worm screw for rotating the worm screw.

22 Claims, 2 Drawing Sheets

POWDER COATING PRODUCT SPRAYER DEVICE

BACKGROUND OF THE INVENTION

The present invention concerns a device for supplying a finely divided product, such as for example, a coating product in powder form, to an installation for spraying the product.

For many industrial purposes, the finely divided product, commonly called "powder", is delivered from a reservoir to its point of utilization such as, for example, a sprayer of the pneumatic or centrifugal type. The powder is conveyed with the aid of a jet of air along a conduit having a substantial length, which conduit often follows a tortuous path and has a relatively small diameter.

It is essential that the supply of powder be continuous, homogenous and stable during a prolonged period and that the supply be controllable with precision and rapidity. For this purpose, one can utilize a suction device of the Venturi type. Use can also be made of a worm screw or an Archimedes screw mounted at the bottom of a hopper and ending at a pipe supplied with entrainment air by an injector. Such a system presents advantages over powder suction devices, notably because of the relative regularity of the mass flow of powder in spite of variable losses in load. The present invention concerns an improvement in systems of this type.

The powders utilized are generally intended to be baked at around 180° C. after having been applied. Now, it has been noted that this baking phase causes yellowing of certain powders. Powders which have been recently developed can be baked at only around 140° C. This permits resolution of the problem of yellowing but introduces another limitation because these powders experience rapid alteration at ambient temperature. They must be stored at low temperatures, preferably between 5° C. and 10° C. In addition, the polymerization point of these powders is low and they are liable to polymerize at points in the supply system where the temperature has a tendency to be elevated, such as, for example, around the worm screw of a mechanical entrainment system, or in the sheath, or tube, surrounding this endless screw.

One of the essential advantages of coating with a finely divided product is that the product which has not struck the target, i.e. the object to be painted, can be recycled by an appropriate recovery device for the powder in the spray enclosure and a device for transporting this recovered powder back to the device for supplying powder to the spraying installation, where the recovered powder is mixed with new powder. The powder undergoes heating during spraying. If the temperature at the outlet of the supply device is too high, there is thus a risk that the powder is not reusable. In addition, there is a risk that the powder which is recovered will raise the temperature of the new powder during mixing of the two, even if the new powder has been stored under refrigeration until the moment when it is poured into the reservoir of the supply system.

The torque resulting from rubbing between the worm screw and the powder, on the one hand, and between the tube and the powder on the other hand, is for the most part dissipated in the form of heat, which has a tendency to raise the temperature of the powder and, as a consequence, to deteriorate the powder.

It has been envisioned to cool the powder during its travel in the supply system or between this system and the associated sprayer. However, the powder is generally made from organic resins, for example epoxy, polyester, acrylic, polyurethane, etc. These materials are poor thermal conductors which are difficult to cool. Raising the temperature of the powder thus creates a situation which it is difficult to correct. In addition, in systems of the prior art, the energy transmitted to the worm screw is susceptible to uncontrolled variations. If it increases, there can be dangerous heating of the powder. If it diminishes, the supply of powder may not be sufficient. In addition, phenomena of depriming (i.e. emptying of the conveying path due to lack of powder or excessive fluidization of the powder) or the formation of "plugs" of powder around the worm screw can take place and these systems must be monitored continuously by an operator to avoid these occurrences.

SUMMARY OF THE INVENTION

It is an object of the present invention to provide a solution to the totality of these problems.

This and other objects are achieved, according to the present invention, by the provision of a device for delivering a finely divided coating product to a sprayer, comprising a conveyer composed of a tube and a worm screw mounted in the tube for transporting the coating produce; a motor coupled to the worm screw for rotating the worm screw; and means associated with the conveyer for limiting the torque which must be transferred from the motor to the worm screw for rotating the worm screw.

Among the torque limiting means envisioned, one can cite the choice of materials and/or the surface state of the worm screw and/or of the tube which surrounds the worm screw along part of its length. One can select the material and/or treat the surface of these elements so that the coefficient of friction between the screw or the tube and the powder is low. Use can be made of a ceramic or a plastic.

As a result of the invention, the torque furnished by the drive motor to the worm screw can be of the order of 2Nm, while it would be of the order of 9Nm with a steel worm screw and/or a steel tube. This low value avoids heating of the powder by friction along the screw or in the tube.

According to another aspect of the invention, the means for limiting the torque can comprise means for measuring the torque transmitted by the drive motor to the worm screw. These means permit control of the drive motor as a function of the measured value of the torque.

The measurement of the torque contributes to the detection of operating anomalies, such as the formation of a plug of powder around the screw which raises the risk of causing polymerization of the powder and/or damage to the drive motor, or even pump depriming, i.e. a condition in which the worm screw no longer conveys powder. In effect, when a powder plug is formed in the tube of the worm screw, the torque opposing rotation of the motor increases. A significant increase in the motor torque thus signifies an anomaly. Similarly, a substantial decrease in the torque signifies either that the worm screw is no longer being supplied with powder, or that a cavity has formed in the tube surrounding the worm screw and the powder is no longer in contact with the worm screw. These torque variations are even easier to detect when the nominal value of the torque is low since the relative value of such variations with respect to the nominal value is then greater.

The means for measuring the torque can thus be associated with a safety installation to control stopping of the installation and/or triggering of an alarm if the measured torque increases beyond a maximum predetermined value, signifying the formation of a plug, or to the contrary if the measured torque decreases below a predetermined minimum value, indicating an occurrence of depriming.

Possibly, between these two limits, one can utilize the measurement of the torque to achieve a regulation of the motor, and more particularly a regulation of its speed, as a function of the measured torque. The regulation would be, for example, such that measurement of an increase in torque (under normal operating conditions), is used to reduce the speed of the motor and measurement of a decrease in the torque is used to increase the motor speed.

Of course, all of the torque limiting means referred to above: reduction in friction at the level of the worm screw, determination of acceptable torque limits and regulation as a function of torque, can be employed independently or in any combination.

Finally, a result of the invention is that the energy necessary for the operation of the drive motor is minimal, due to the low coefficient of friction of the bodies in contact with the powder, and it is permanently maintained at its optimum value as a result of regulation of the drive motor.

The invention will be better understood and other advantages thereof will appear more clearly from the description which follows of an embodiment of a supply device according to the invention for a spraying installation for finely divided product, the embodiment representing a nonlimiting example, and the description being made with reference to the attached drawings.

Figure 1:
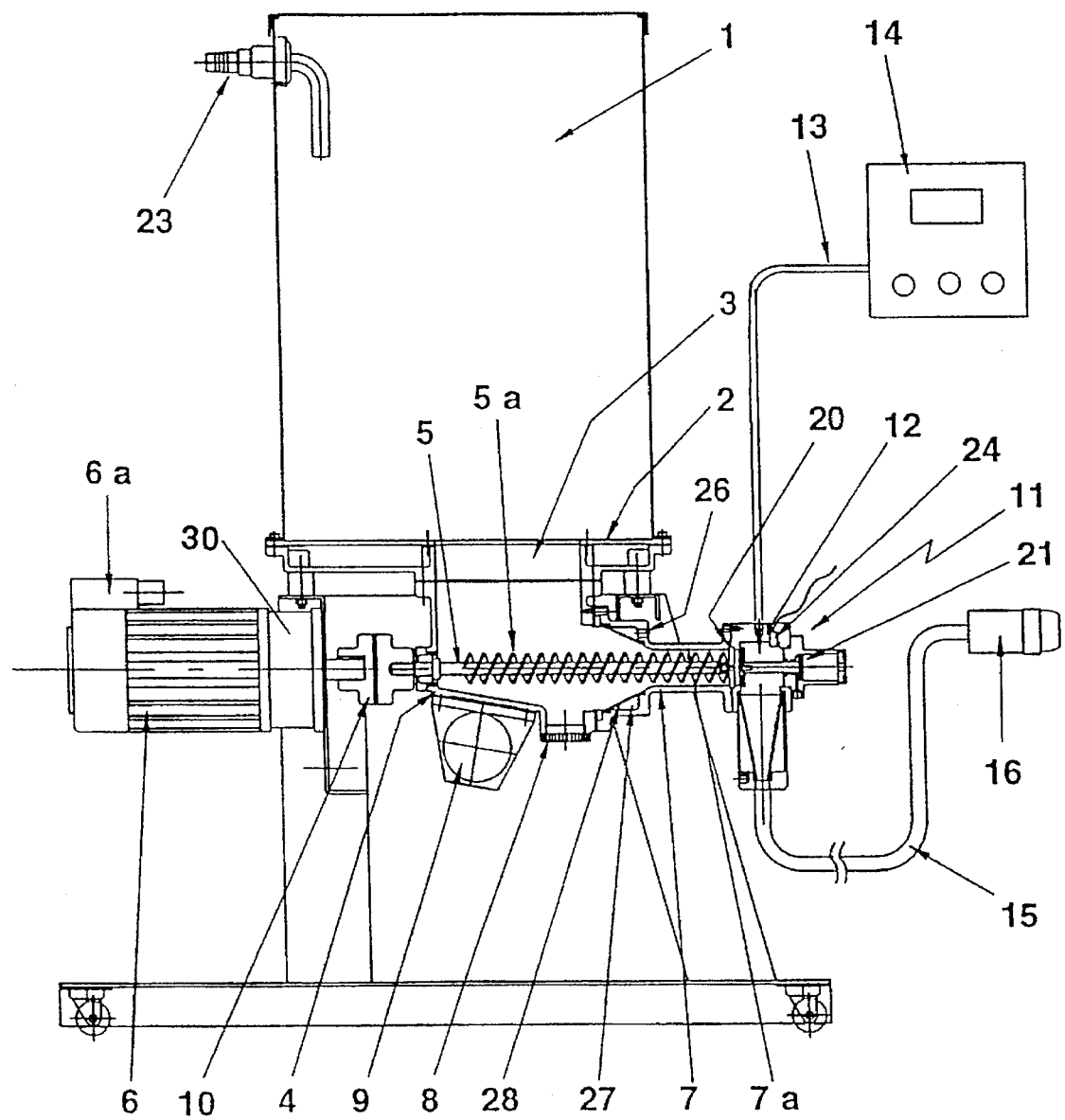
FIG. 1 is a simplified pictorial elevational view of a preferred embodiment of a device according to the present invention.
Figure 2:
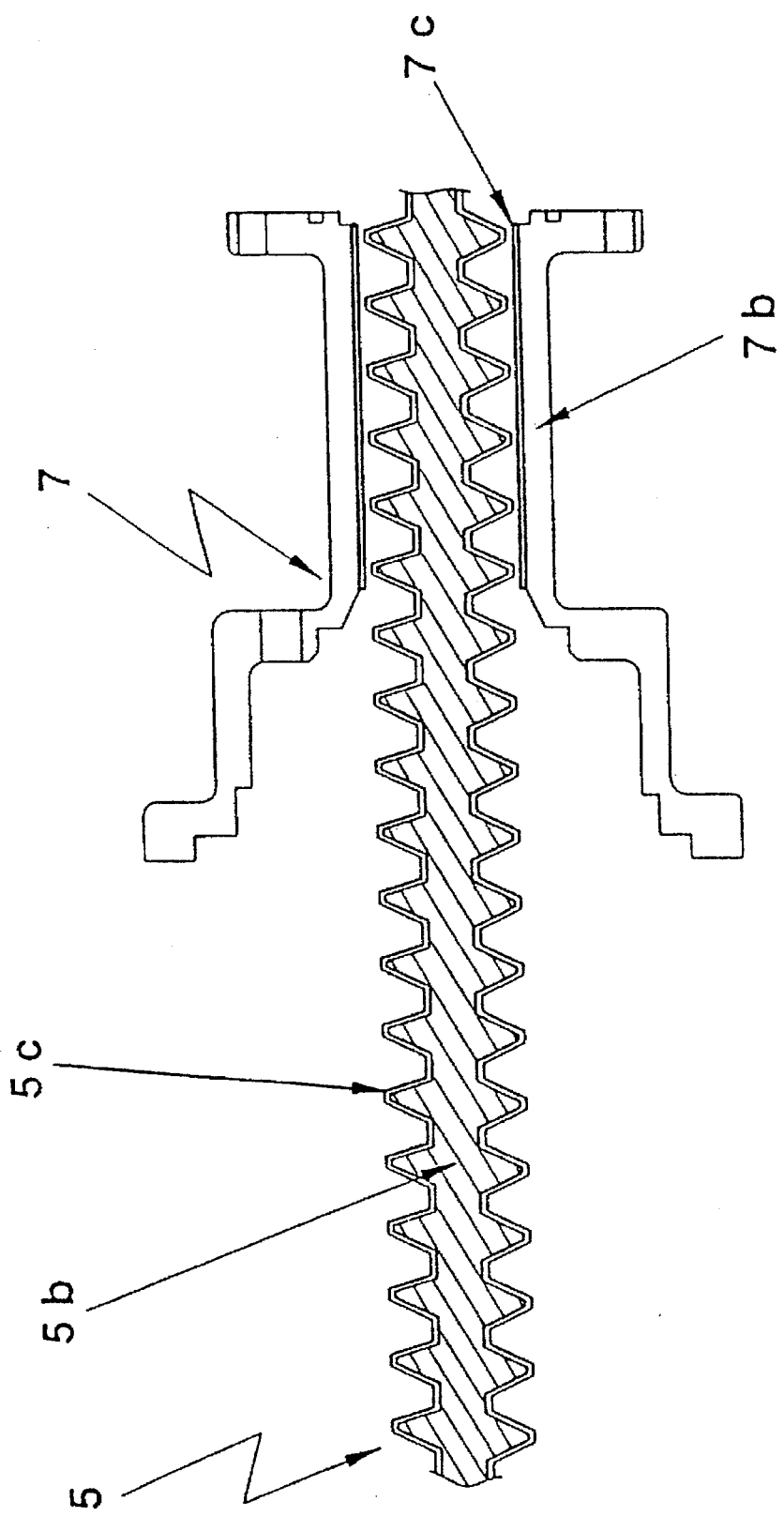
FIG. 2 is a detail view, partly in cross section and to a larger scale than FIG. 1, of an embodiment of a worm screw and tube according to a variation of the embodiment shown in FIG. 1.

DESCRIPTION OF THE PREFERRED EMBODIMENTS

The device of FIG. 1 includes a fluidized powder storage reservoir 1 the bottom of which is constituted by a porous plate 2 through which a gas such as air is injected in order to fluidize the powder and carry, or entrain, it toward an opening 3. Opening 3 is provided in the bottom of reservoir 1 and is extended by a body 4 forming a hopper in which a worm screw 5 is installed. Screw 5 is driven by a motor 6. One end of body 4, at the side downstream of worm screw 5, forms a tube, or sheath, 7 partially surrounding screw 5. Body 4 includes, in its lower part, a drainage opening which is normally blocked by a removable plug 8. A vibrator 9 is mounted on body 4, at the exterior thereof. During periods of use of the device, the assembly constituted by reservoir 1 and body 4 is thus caused to vibrate. In order to prevent heat generated by the operation of motor 6 from being transmitted to screw 5, a thermal seal 10 forming a mechanical coupler is placed between motor 6 and screw 5.

The device also comprises a discharge device 11 connected to the outlet of tube 7 and comprising an injector 12 which is supplied with air by a compressed air supply conduit 13 connected to a control unit 14. The compressed air source and possibly a regulator which may be necessary are not shown in detail. The outlet of discharge device 11 is connected to a flexible conduit 15 conveying powder to an electrostatic sprayer 16, for example of the automatic type. Along the path of the powder, between screw 5 and discharge device 11 there is disposed a nonreturn valve 20, controlled by a double acting pneumatic cylinder, or jack, 21. Powder recovered in the spray booth (not shown) of the installation and intended to be recycled is returned to the supply device via a conduit whose inlet 23 opens into the upper party of reservoir 1.

Motor 6 is a dc motor or a motor having an equivalent characteristic, i.e. a motor which is driven by a current proportional to the torque which it produces, which permits easy measurement of the motor output torque by means of a measuring and control cell **6*a*. A servo system can also be included in the cell 6*a* in order to maintain the motor output torque at a value equal to an assigned value. A significant variation corresponding to an increase in the torque signifies in general the formation of a powder plug in which the powder can be heated, or can even polymerize. A variation corresponding to a decrease in the torque signifies pump depriming, for example by the formation of a cavity around screw 5**. In case of an abnormal variation in the torque, corrective actions, the triggering of an alarm, or shut down of the device can be effected.

According to a variation of the above-described embodiment, torque measuring means can include a pressure sensor 24 placed at the inlet of discharge device 11. The pressure in discharge device 11 bears a fixed relation to the torque transmitted to screw 5 in that the pressure increases with torque. In case of a blockage of conduit 15, the pressure in discharge device 11 increases and the torque necessary for rotating screw 5 in order to push the powder into discharge device 11 also increases. Similarly, in case of depriming of screw 5, the pressure in discharge device 11 becomes equal to the pressure in reservoir 1, i.e. close to atmospheric pressure.

The pressure sensor can thus provide an indication when the torque transmitted to screw 5 deviates from an acceptable operation range. After adequate calibration, it can also provide information, on a permanent basis during all of the operating phases of the device, of the value of the torque transmitted by motor 6 to screw 5. It can be relayed to the control cell **6*a* in order to control motor 6. In this case, motor 6** can be of any type.

According to another variant of the invention, a torque meter 30 can be installed on the shaft connecting motor 6 to screw 5, for example in proximity to seal 10. As previously, it can be connected to cell **6*a* in order to control motor 6. In this case also, motor 6** can be of any type.

According to the invention, the exterior surface **5*a* of screw 5 is made of a material having a low coefficient of friction with the powder. It can be made of a ceramic or a plastic material, such as, for example, polytetrafluoroethylene (PTFE), polyethylene or polyesterterephtalate (PTEP). Other materials with equivalent tribologic characteristics can also be utilized without departing from the framework of the invention. The internal surface 7*a* of tube 7** can also be made of a material of the same type.

The torque necessary to drive screw 5 in rotation and to transport the finely divided coating product is low; the heat dissipated in the powder at the level of screw 5 and of tube 7 is thus limited, which prevents heating and consequent deterioration of the powder.

Tube 7 is provided with holes, or spouts, 26 distributed around the worm screw for placing a circular chamber 27 in communication with the ambient air. The chamber 27 is situated in body 4 at the inlet of tube 7 and is separated from the powder penetrating into tube 7 by a porous plate 28. This arrangement permits a part of the air trapped in the powder to be evacuated toward the ambient atmosphere after having acted to fluidize the powder during the first part of its transport. Holes 26 are provided in a number sufficient that the totality of their cross sections permits maintenance in chamber 27 of a pressure approaching atmospheric. This permits the powder to be compacted in tube 7 without danger that screw 5 will "skate" in a mixture which is too fluid. It has been shown experimentally that in the absence of such holes 26, the pressure of the finely divided mixture becomes equal at one end and the other of tube 7. It is then not possible to transport the powder by means of the worm screw, and the worm screw will simply turn within the mixture without conveying it. The torque transmitted to screw 5 would then be very low and its value would be outside of acceptable limits.

Worm screw 5 and tube 7 shown in FIG. 1 are each made of the same material, i.e. obtained by machining or any other appropriate processing of a piece of the selected material in order to obtain the desired state of surfaces **5*a* and 7*a*. According to another embodiment of the invention, shown in FIG. 2, screw 5 and/or tube 7 can have a frame, or core, 5*b* and 7*b*, respectively, made of a material selected for its mechanical properties, such as for example steel, and frame 5*b* can be covered by a layer 5*c* of a material having a low coefficient of friction and/or frame 7*b* can be covered with a lining 7*c* of a similar low coefficient of friction material. Layer 5*c* can be deposited by a surface treatment of frame 5*b*. This embodiment is particularly advantageous in the case of use of a ceramic, which can have a low resiliency, or of PTFE, which flows easily and can be damaged by an abrasive powder, in order to form layer 5*c* and/or 7*c*** with a low coefficient of friction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A device for delivery a finely divided coating product to a sprayer, comprising:

a conveyer composed of a tube and a worm screw mounted in said tube for transporting the coating product;

a motor coupled to said worm screw for rotating said worm screw; and means associated with said conveyer for limiting the torque which must be transferred from said motor to said worm screw for rotating said worm screw wherein said tube surrounds at least a portion of said worm screw and said tube is provided with at least one hole for evacuation of air contained in the coating product.

2. The device according to claim 1, further comprising: a hopper for delivering coating product to said conveyor, said hopper having a chamber into which said hole opens; and a porous plate disposed in said hopper for separating said chamber from the coating product.

3. A device for delivery a finely divided coating product to a sprayer, comprising:

a conveyer composed of a tube and a worm screw mounted in said tube for transporting the coating product;

a motor coupled to said worm screw for rotating said worm screw; and means associated with said conveyer for limiting the torque which must be transferred from said motor to said worm screw for rotating said worm screw, wherein said screw has an outer surface and said tube has an inner surface, each surface being disposed to contact the coating product and being of a material having a low coefficient of friction with the coating product, each surface constituting part of said means for limiting the torque.

4. An apparatus for spraying a finely divided coating product onto an object, comprising:

a conveyer composed of a tube and a worm screw mounted in said tube for transporting the coating product;

a motor coupled to said worm screw for rotating said worm screw;

means associated with said conveyer for limiting the torque which must be transferred from said motor to said worm screw for rotating said worm screw; and a sprayer coupled to said converter for receiving coating product transported by said conveyor and for spraying the coating product onto the object, wherein at least one of said worm screw and said tube has a surface disposed to contact the coating product, said surface being of a material having a low coefficient of friction with the coating product, which surface constitutes at least part of said means for limiting the torque.

5. The apparatus as defined in claim 4 wherein said screw has an outer surface and said tube has an inner surface, each surface being disposed to contact the coating product and being of a material having a low coefficient of friction with the coating product, each surface constituting part of said means for limiting the torque.

6. The apparatus as defined in claim 5 wherein at least one of said worm screw and said tube consists of a homogeneous body.

7. The apparatus as defined in claim 5 wherein at least one of said worm screw and tube is constituted by a frame member covered with a layer of the material having a low coefficient of friction with the coating product.

8. The apparatus according to claim 5 wherein at least one of said surfaces is of a ceramic material.

9. The apparatus as defined in claim 8 wherein at least one of said worm screw and said tube consists of a homogeneous body.

10. The apparatus as defined in claim 8 wherein at least one of said worm screw and tube is constituted by a frame member covered with a layer of the material having a low coefficient of friction with the coating product.

11. The apparatus according to claim 5 wherein at least one of said surfaces is of a plastic material.

12. The apparatus as defined in claim 11 wherein at least one of said worm screw and said tube consists of a homogeneous body.

13. The apparatus as defined in claim 11 wherein at least one of said worm screw and tube is constituted by a frame member covered with a layer of the material having a low coefficient of friction with the coating product.

14. The apparatus according to claim 11 wherein the at least one surface is made of polytetrafluoroethylene, polyesterterephtalate, or polyethylene.

15. The apparatus according to claim 4 wherein said means for limiting the torque comprise means for measuring the torque transmitted to said screw.

16. The apparatus as defined in claim 15 wherein said motor is driven by an electric current and the torque generated by said motor bears a direct relation to the magnitude of the current supplied to said motor.

17. The apparatus as defined in claim 16 further comprising means for controlling said motor as a function of the torque measured by said measuring means.

18. The apparatus according to claim 15 wherein discharge device is disposed to receive coating product from said conveyor, and said measuring means comprise a pressure sensor disposed for measuring the pressure in the discharge device.

19. The apparatus as defined in claim 18 further comprising means for controlling said motor as a function of the torque measured by said measuring means.

20. The apparatus according to claim 15 wherein said measuring means comprise a torque meter operatively associated with the axis of rotation of said worm screw.

21. The apparatus as defined in claim 20 further comprising means for controlling said motor as a function of the torque measured by said measuring means.

22. The separate as defined in claim 15 further comprising means for controlling said motor as a function of the torque measured by said measuring means.

* * * * *